United States Patent Office 3,845,143
Patented Oct. 29, 1974

3,845,143
PROCESS FOR ALKYLATING PHENOLS
John C. Wollensak, Bloomfield Hills, Mich., assignor to Ethyl Corporation, Richmond, Va.
No Drawing. Filed May 13, 1971, Ser. No. 143,239
Int. Cl. C07c 39/06
U.S. Cl. 260—624 C                11 Claims

ABSTRACT OF THE DISCLOSURE

A process for alkylating a phenol having a replaceable nuclear hydrogen atom by reacting the phenol with a primary or secondary alkyl amine in contact with a hydrogenation-dehydrogenation catalyst at a temperature of from about 125–500° C. For example, the reaction of 2,6-di-*tert*-butylphenol with methyl amine in the presence of a supported palladium catalyst forms 2,6-di-*tert*-butyl-*p*-cresol, a commercial antioxidant.

BACKGROUND

Methods for alkylating phenols are known. The reaction of an olefin or an alkyl halide with phenol in the presence of an acid or Friedel-Crafts catalyst (e.g., aluminum chloride) produces alkylphenols. Phenols can be selectively orthoalkylated by reacting a phenol with an olefin in the presence of an aluminum phenoxide catalyst (Kolka et al., U.S. 2,831,898). The reaction of phenol with methanol using a zirconia, alumina or magnesia catalyst is reported to form *o*-methylphenols (French 1,570,510; U.S. 3,446,-856). Reaction of phenol with formaldehyde, methanol and a strong base at elevated temperatures is also reported to form methylphenols (U.S. 2,841,623).

SUMMARY OF THE INVENTION

It has now been found that phenols having a replaceable nuclear hydrogen atom can be alkylated in the phenol nucleus by reacting the phenol with a primary or secondary alkyl amine in the presence of a hydrogenation-dehydrogenation catalyst at a temperature of from 125–500° C. The alkyl group from the amine is transferred to a nuclear phenol carbon atom and becomes bonded to the phenol nucleus at the former alpha carbon atom of the alkyl amine. Carrying the reaction out under hydrogen pressure improves yields and product purity.

DESCRIPTION OF THE PREFERRED EMBODIMENTS

A preferred embodiment of the invention is a process for alkylating a phenol having at least one replaceable nuclear hydrogen atom, said process comprising reacting said phenol with a primary or secondary amine in contact with a hydrogenation-dehydrogenation catalyst at a temperature of from about 125–500° C., said amine having at least one hydrogen atom bonded to an alpha carbon atom.

The phenols which can be alkylated using the process are any of the hydroxy aromatics having at least one replaceable hydrogen atom. Replaceable hydrogen atoms are generally those bonded to the phenol nuclear ring at positions ortho or para with respect to the phenolic hydroxyl group. When these positions are occupied by groups other than replaceable hydrogen atoms the reaction can be forced such that hydrogen atoms bonded to the phenol nuclear ring at a meta position are replaced.

The phenols can be mono- or poly-nuclear and also mono- or poly-hydroxy as long as they possess a replaceable hydrogen atom on the phenolic ring. They can be any of a broad range of hydroxy aromatics meeting this requirement. The aryl portion of the hydroxy aromatic may also be fused to other cyclic systems including heterocyclic systems such as those containing cyclo oxygen, nitrogen and sulfur rings. For example, the hydroxy aromatic can be any of the isomeric hydroxy-substituted derivatives of benzene, naphthalene, anthracene, phenanthrene, indene, isoindene, benzofuran, isobenzofuran, thionaphthene, indole, isoindole, indolenine, 2-isobenzazole, 1,2-bezodiazole, 1,3-benzodiazole, indiazine, 1,3-benzoisodiazole, 1,2,3-benzotriazole, benzisoxazole, benzoxadiazole, 1,2-benzopyran, 1,4-benzopyran, 1,2-benzopyrone, quinoline, isoquinoline, 1,3-benzodiazine, 1,2-benzisoxazine, acenaphthene, fluorene, dibenzopyrrole, xanthene, thianthrene, phenothiazine, phenoxazine, naphthacene, chrysene, pyrene, triphenylene, and the like, wherein the hydroxyl group is bonded to a nuclear carbon atom.

The process is also applicable to aryl hydroxy compounds having more than one hydroxyl radical bonded to a nuclear aromatic carbon atom. For example, the process can be applied to such polyhydroxy aromatics as hydroquinones, resorcinols, catechols, 1,3-dihydroxy naphthalenes, pyrogallols, phloroglucinols, and the like.

Substituents other than hydroxyl groups can be present in the aromatic compounds as long as they do not interfere with the course of the reaction. That is to say, the other substituents should be relatively inert to primary and secondary amines. For example, any of the previously-listed aromatics may be substituted in a variety of positions with alkyl radicals, aralkyl radicals, cycloalkyl radicals, chlorine, bromine, iodine, fluorine, and the like. A few representative examples of these using the simpler aromatic structure are *p*-chlorophenol, *p*-nitrophenol, β-bromo-α-naphthol, β-chloro-7-hydroxy-coumarone, 2-acetoxy - 7 - hydroxy-indolenine, 3-*n*-dodecyl-7-hydroxy-benzisoxazole, 8-hydroxy - 1,2 - benzopyran, 7-*sec*-octadecyl-8-hydroxy-isocoumarin, and the like.

The reaction proceeds very well when the hydroxy aromatic is a hydroxy-substituted mononuclear aromatic. As previously, these phenol type materials can be substituted with other groups as long as they do not interfere with the course of the reaction. A preferred class of such mononuclear hydroxy aromatics are those having the formula:

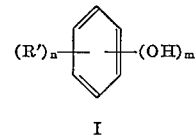

I wherein *n* is an integer from 0–2, *m* is an integer from 1–2, and R is selected from the group consisting of aliphatic alkyl radicals containing from 1–50 carbon atoms, aralkyl radicals containing from 7–20 carbon atoms and cycloalkyl radicals containing from 6–20 carbon atoms. Some examples of these are: phenol, catechol, resorcinol, pyrogallol, phluoroglucinol, hydroquinone, 3,5-di-*tert*-butylphenol, 2,6 - di - *tert* - butyl-hydroquinone, 3-methyl catechol, *p*-cresol, *m*-cresol, *p*-pentacontyl phenol, 2,4-didodecyl phenol, *o*-cyclohexyl phenol, 3-cyclooctyl phenol, *p*-(4-*sec*-dodecylcyclohexyl) phenol, 2,4,6-trimethyl phluoroglucinol, *m*-*sec*-eicosyl phenol, *p*-(4-*tert*-tridecylbenzyl)phenol, 4-(3,5-di - *sec* - heptylcyclohexyl) phenol, and 2-*sec*-pentacontyl hydroquinone.

Mononuclear phenols can be used in which at least one position ortho to the phenoxide oxygen atom is substituted with a radical selected from the group consisting of primary and secondary alkyl radicals containing from 1–50 carbon atoms, mononuclear aryl radicals containing from 6–20 carbon atoms, cycloalkyl radicals containing from 6–20 carbon atoms and primary and secondary aralkyl radicals containing from 7-20 carbon atoms. These are phenols having the formula:

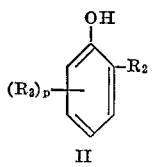

II wherein $p$ is an integer from 0-1, $R_2$ is selected from the group consisting of primary and secondary aliphatic alkyl radicals containing from 1-50 carbon atoms, primary and secondary aralkyl radicals containing from 7-20 carbon atoms, mononuclear aryl radicals containing from 6-20 carbon atoms and cycloalkyl radicals containing from 6-20 carbon atoms, and $R_4$ is selected from the group consisting of aliphatic alkyl radicals containing from 1-50 carbon atoms, aralkyl radicals containing from 7-20 carbon atoms, mononuclear aryl radicals containing from 6-20 carbon atoms, and cycloalkyl radicals containing from 6-20 carbon atoms. Some examples of the phenolic starting materials are:

o-sec-butylphenol,
2,5-dimethylphenol,
o-ethylphenol,
2,4-di-sec-butylphenol,
2,4-dimethylphenol,
2-(α-methylbenzyl)phenol,
2-cyclohexyl-p-cresol,
2-(3,5-di-tert-butyl-cyclohexyl)-6-sec-eicosylphenol,
2-sec-pentacontylphenol,
2-(α-methyl-4-dodecylbenzyl)phenol,
2-phenylphenol,
2-(4-tetradecylphenyl)phenol,
2-(3,5-di-sec-heptylphenyl)phenol,
2-triacontylphenol,
2-isopropylphenol,
2,4-di-sec-dodecylphenol, and
2-(α-methyl-4-sec-amylbenzyl)phenol.

One feature of this invention is its ability to alkylate in the para position when both positions on the aromatic nucleus ortho to the hydroxyl group are substituted. When olefins are used to do this with a Friedel-Craft catalyst the product is a p-secondary alkyl phenol whereas the present process can give primary alkylation. Also, if the other alkyl groups on the amine are tertiary, such as the case with 2,6-di-tert-butylphenol, any attempt to alkylate using Friedel-Crafts or any Lewis acid catalyst will lead to dealkylation of the tert-alkyl groups. The present process avoids this.

When the aromatic hydroxy compound is a mononuclear phenol the phenolic reactant used in this embodiment of the invention has the formula:

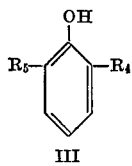

III wherein $R_4$ and $R_5$ are selected from the same group as $R_2$ in Formula II. Some examples of these phenols are:

2,6-dimethylphenol,
2,6-di-sec-butylphenol,
2,6-di-sec-butyl-p-cresol,
2,6-diisopropylphenol,
2,6-di-sec-octylphenol,
2,6-di(α-methylbenzyl)phenol,
6-(α-methylbenzyl)-o-cresol,
2-methyl-6-(2,3-benzobenzyl)phenol,
2-(3-tert-butyl-5-isopropylbenzyl)-6-methylphenol,
2,6-di-cyclooctylphenol,
2,6-dibornylphenol,
2,6-dicyclohexylphenol,
6-sec-pentacontyl-o-cresol,
2-methyl-6-docosylphenol,
6-phenyl-o-cresol,
2-methyl-6-(4-tetradecylphenyl)phenol,
2-ethyl-6-(3,5-diheptylphenol)phenol,
and the like.

The amine reactant is a primary or secondary alkyl amine or mixtures thereof. These are ammonia derivatives in which one or two hydrogen atoms are replaced by alkyl groups. The resultant alkyl amine has at least one hydrogen atom bonded to the amine nitrogen atom. A further requirement is that an alpha carbon atom on at least one of the alkyl groups must have a hydrogen substituent. In essence, the requirement is that the alkyl amine contain in its structure the following unit:

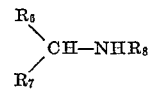

wherein $R_6$, $R_7$ and $R_8$ can be hydrogen or an alkyl group. When $R_8$ is an alkyl group containing a hydrogen atom bonded to the alpha carbon atom it will also be utilized in alkylating the phenol. Some examples of useful alkyl amines are:

| | |
|---|---|
| methyl amine | n-heptyl amine |
| dimethyl amine | n-octyl amine |
| ethyl amine | 2-ethylhexyl amine |
| diethyl amine | di-n-hexyl amine |
| isopropyl amine | n-dodecyl amine |
| n-propyl amine | di-n-dodecyl amine |
| n-butyl amine | n-tridodecyl amine |
| isobutyl amine | sec-octadecyl amine |
| sec-butyl amine | n-octadecyl amine |
| methyl isobutyl amine | sec-eicosyl amine |
| n-pentyl amine | n-eicosyl amine |
| n-hexyl amine | n-eicosyl methyl amine |

The more preferred alkyl amines are those in which the alkyl groups contain from 1 to about 20 carbon atoms. In a still more preferred embodiment the alkyl amine is a primary alkyl amine. In another preferred embodiment the mono- or di-alkyl amine is one in which an alkyl group is a normal or straight chain alkyl; for example, n-alkyl primary amines containing from 1 to about 20 carbon atoms such as methyl amine, ethyl amine, n-propyl amine, n-butyl amine, n-hexyl amine, n-octyl amine, n-dodecyl amine, n-octadecyl amine, and n-eicosyl amine. The amines can be employed in the form of aqueous solutions.

Yields and purities are generally improved by carrying the reaction out in the presence of hydrogen, although this is not a requirement because the reaction proceeds, especially with the lower alkyl amines, without additional hydrogen. Additional hydrogen can readily be provided by conducting the reaction under hydrogen pressure. A useful hydrogen partial pressure range is from about 10-1000 p.s.i.g., and a more preferred hydrogen partial pressure range is from about 50-50 p.s.i.g.

The reaction requires the presence of a hydrogenation-dehydrogenation catalyst. These are the group of catalysts which are known in the art to catalyze the hydrogenation and dehydrogenation of organic compounds. They include such catalysts as palladium on charcoal, rhodium on charcoal, palladium on alumina, palladium on silica, platinum on alumina, nickel salts, Raney nickel, copper chromite, copper salts, cobalt salts, platinum on carbon, chrominum oxide. Suitable supports include alumina, silica, silica-alumina, magnesia, zirconia, titania, charcoal, and the like. Examples include alumina-chromia, magnesia-chromia, alumina-molybdena, alumina-vanadia, alumina-vanadia-zinc oxide, alumina-urania, alumina-tungstate, alumina-copper-palladium, and the like.

The preferred catalyst is a supported palladium catalyst such as palladium on charcoal.

The process should be carried out at a temperature high enough to cause the reaction to proceed at a useful rate, but no so high as to decompose the reactants or products. A useful temperature range is from about 125–500° C. A more preferred temperature range is from about 200–350° C.

Generally, from about 1 to 10 moles of alkyl amine are used per mole of the phenol compound. This ratio is not critical. Sometimes it is preferred to use smaller amounts of amine and to recycle the unalkylated phenol in the resultant product. In this manner, mono-alkylation is increased.

Although not required, it is generally preferred to conduct the reaction in the presence of water. This is because ammonia is a by-product of the reaction and can deactivate the catalyst after the reaction has proceeded for a while. Also, lower amines such as the methyl amines are more easily handled in aqueous solutions. When water is added, a useful range is from 10 to 500 parts per 1000 parts of reaction mixture.

The process can be carried out by a variety of techniques. In its simplest embodiment the phenol reactant, the catalyst and the alkyl amine are placed in a pressure reaction vessel and the mixture stirred and heated to reaction temperature. Generally some water is included. After remaining at reaction temperature for a time sufficient to obtain the desired conversion the mixture is cooled, filtered to remove catalyst, any water phase present removed and distilled to recover product. In another embodiment the reaction mixture is stirred and heated to reaction temperature, and then pressurized with hydrogen. When carried out continuously, a mixture of the phenol and alkyl amine is passed through a fixed bed catalyst at reaction temperature at such a rate to provide good conversions to the alkylated product. Hydrogen pressure can be beneficially employed in the continuous method.

The manner in which the process is conducted is illustrated by the following examples. All parts are by weight unless otherwise indicated.

Example 1

In a pressure reaction vessel was placed 94 parts of phenol, 219 parts of diethyl amine, 125 parts of water, and 9.5 parts of a 5 percent palladium on charcoal catalyst. The vessel was purged with nitrogen, sealed and, while stirring, heated to 250° C. It was stirred at this temperature for 8 hours and then cooled. The contents were removed and washed with dilute aqueous hydrochloric acid and extracted with ether. The ether was evaporated from the extract and the remainder distilled under vacuum to recover unreacted phenol, o-ethyl phenol, p-ethyl phenol and 2,6-diethyl phenol as the main products.

Example 2

In a pressure reaction vessel was placed 82 parts of 6-*tert*-butyl-*o*-cresol and 4.8 parts of 5 percent palladium on charcoal. The vessel was purged with nitrogen and then pressurized to 125 p.s.i.g. with hydrogen. It was heated to 200° C., while stirring, causing the pressure to drop to zero. The vessel was cooled and then 270 parts of 25 weight percent aqueous solution of dimethyl amine were added. It was sealed and heated to 250° C., causing the pressure to rise to 930 p.s.i.g. It was stirred one hour at 250° C., during which period pressure gradually rose to 1220 p.s.i.g. The pressure rise was due to the alkyl groups from the dimethyl amine being utilized such that monomethyl amine and ammonia were formed. The reaction mixture was then cooled and filtered and distilled to obtain a 56.9 percent conversion and almost quantitative yield of 2,4-dimethyl-6-*tert*-butylphenol.

Example 3

In a pressure reaction vessel was placed 168 parts of 2,6-di-*tert*-butylphenol, 155 parts of 40 percent aqueous methyl amine, and 9.6 parts of 5 percent palladium on charcoal. The vessel was purged with nitrogen, sealed, and, while stirring, heated to 235° C. (4200 p.s.i.g.). It was stirred at this temperature for 9 hours (4600 p.s.i.g.) and then cooled. The product was 2,6-di-*tert*-butyl-*p*-cresol, obtained in 62 percent conversion and almost quantitative yield.

Example 4

In a pressure reaction vessel was placed 112 parts of *n*-propyl amine, 103 parts of 2,6-di-*tert*-butylphenol, 100 parts of water, and 10 parts of a 5 percent palladium on charcoal catalyst. The vessel was sealed and, while stirring, heated to 250° C. Pressure rose to 920 p.s.i.g. Stirring was continued at 250° C. for 12 hours, during which period pressure gradually increased to 1110 p.s.i.g. The vessel was then cooled and its contents removed. The mixture was diluted with benzene and filtered to remove catalyst. The water layer was then removed from the filtrate. The benzene solution was dried over magnesium sulfate and then the benzene solvent distilled off under vacuum, leaving 125 parts of residue. This residue was then distilled to recover 2,6-di-*tert*-butyl-4-*n*-propylphenol in good yield.

Example 5

In a pressure reaction vessel place 144 parts of naphthol-1, 80 parts of ethyl amine, and 5 parts of Raney nickel catalyst. Flush with nitrogen, seal, and pressurize to 50 p.s.i.g. with hydrogen. Heat to 275° C. and stir for 8 hours. Cool to room temperature and vent. Recover the product, 2-*n*-propyl-naphthol-1, by distillation.

Example 6

In a pressure reaction vessel place 206 parts of 2,6-di-*tert*-butylphenol, 151 parts of *n*-hexyl amine, and 5 parts of 5 percent rhodium supported on silica alumina. Purge with nitrogen and seal. Heat to 275° C. and stir at that temperature for 4 hours. Increase the vessel pressure 50 p.s.i.g. by adding hydrogen and stir an additional hour. Cool and vent. Remove the vessel contents and filter to recover catalyst. Distill the filtrate under vacuum to recover 2,6-di-*tert*-butyl-4-*n*-hexylphenol as the main product.

Other primary or secondary amines can be employed in the above example to yield similar compounds in which the alkyl group from the amine is bonded to the 4 position of 2,6-di-*tert*-butylphenol. For example, *n*-dodecyl amine yields 2,6 - di - *tert*-butyl-4-*n*-dodecylphenol. Likewise, isobutyl amine produces 2,6-di-*tert*-butyl-4-isobutylphenol. Similarly, *n*-eicosyl amine forms 2,6-di-*tert*-butyl-4-*n*-eicosylphenol.

Likewise, other well-known hydrogenation-dehydrogenation catalysts can be employed in place of the supported rhodium catalyst, such as copper chromite, platinum on kieselguhr, and the like.

The alkylated phenols produced by this process have a number of well-known uses, such as antioxidants, bactericides, photographic developing agents, etc. The compound 2,6-di-*tert*-butyl-*p*-cresol prepared as described in Example 3 is a well-known antioxidant used in stabilizing a wide variety of organic materials including polybutadiene, polyisoprene, and various synthetic rubbers and polyolefins. It is also an FDA approved food antioxidant.

Polyisoprene made by the solution polymerization of isoprene using a diethyl aluminum chloride catalyst can be stabilized against oxidative degradation by adding sufficient 2,6-di-*tert*-butyl-*p*-cresol to the polymer solution after completion of the polymerization to provide 0.5 parts per 100 parts of polymer and then steam stripping the solution to remove the solvent. The resultant polyisoprene crumb can be dried and stored for long periods without degradation.

I claim:

1. A process for alkylating a phenol having at least one replaceable nuclear hydrogen atom in an ortho or para position, said phenol being selected from the group consisting of phenol and alkyl-substituted phenols, said process comprising reacting said phenol with a primary or secondary $C_{1-20}$ alkyl amine in contact with a hydrogenation-dehydrogenation catalyst, said catalyst containing a catalytic metal selected from the group consisting of palladium, rhodium, platinum, nickel, copper, chromium, cobalt, molybdenum, vanadium, zinc, uranium and tungsten, at a temperature of from about 125–500° C., said $C_{1-20}$ alkyl amine having at least one hydrogen atom bonded to an alpha alkyl carbon atom and at least one hydrogen atom bonded to the amine nitrogen atom.

2. A process of Claim 1 carried out under hydrogen pressure.

3. A process of Claim 1 wherein said phenol is a mononuclear phenol.

4. A process of Claim 3 wherein said catalyst is a supported palladium catalyst.

5. A process of Claim 3 wherein said alkyl amine is a primary alkyl amine containing from 1 to about 20 carbon atoms.

6. A process of Claim 5 wherein said catalyst is a supported palladium catalyst.

7. A process of Claim 6 wherein said phenol is 2,6-di-tert-butylphenol.

8. A process of Claim 7 wherein said primary alkyl amine is methyl amine.

9. A process of Claim 7 wherein said primary alkyl amine is ethyl amine.

10. A process of Claim 7 wherein said primary alkyl amine is n-propyl amine.

11. A process of Claim 7 wherein said primary alkyl amine is n-butyl amine.

References Cited

UNITED STATES PATENTS

| | | | |
|---|---|---|---|
| 2,831,898 | 4/1958 | Ecke et al. | 260—624 C |
| 2,841,623 | 5/1957 | Norton et al. | 260—624 |
| 3,446,856 | 5/1964 | Hamilton | 260—620 |
| 3,564,031 | 2/1971 | Potts | 260—671 R |
| 2,976,280 | 3/1961 | Hotelling | 260—624 R |

FOREIGN PATENTS

| | | | |
|---|---|---|---|
| 1,068,340 | 5/1967 | Great Britain | 260—624 C |

BERNARD HELFIN, Primary Examiner

W. B. LONE, Assistant Examiner

U.S. Cl. X.R.

260—619 R, 621 R